United States Patent
Belmont et al.

(10) Patent No.: US 11,040,312 B2
(45) Date of Patent: Jun. 22, 2021

(54) POROUS MEMBRANE HAVING A FLUORINATED COPOLYMER AS SURFACE TREATMENT

(71) Applicants: Pall Corporation, Port Washington, NY (US); Centre National de la Recherche Scientifique, Paris (FR)

(72) Inventors: James A Belmont, Sea Cliff, NY (US); Bruno Ameduri, Montpellier (FR); Hassan Ait-Haddou, Gulf Breeze, FL (US); Gerald Lopez, Lunel-Viel (FR)

(73) Assignees: Pall Corporation, Port Washington, NY (US); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 16/407,872

(22) Filed: May 9, 2019

(65) Prior Publication Data

US 2020/0353427 A1    Nov. 12, 2020

(51) Int. Cl.

| | |
|---|---|
| *B01D 71/80* | (2006.01) |
| *B01D 71/32* | (2006.01) |
| *B01D 71/34* | (2006.01) |
| *B01D 71/52* | (2006.01) |
| *B01D 69/02* | (2006.01) |
| *B01D 69/12* | (2006.01) |
| *B01D 67/00* | (2006.01) |
| *C01B 17/90* | (2006.01) |
| *B01D 71/36* | (2006.01) |
| *B01D 71/76* | (2006.01) |
| *B01D 69/10* | (2006.01) |

(52) U.S. Cl.
CPC ............. *B01D 71/80* (2013.01); *B01D 67/00* (2013.01); *B01D 67/0088* (2013.01); *B01D 69/02* (2013.01); *B01D 69/10* (2013.01); *B01D 69/12* (2013.01); *B01D 71/32* (2013.01); *B01D 71/34* (2013.01); *B01D 71/36* (2013.01); *B01D 71/52* (2013.01); *B01D 71/76* (2013.01); *C01B 17/90* (2013.01); *B01D 2325/30* (2013.01)

(58) Field of Classification Search
CPC ........ B01D 71/32; B01D 71/34; B01D 71/36; B01D 71/52; B01D 71/80; B01D 67/00; B01D 69/02; B01D 2325/30; B01D 69/12; C01B 17/90
See application file for complete search history.

(56) References Cited

U.S. PATENT DOCUMENTS

| | | |
|---|---|---|
| 5,928,792 A | 6/1999 | Moya |
| 5,976,380 A | 11/1999 | Moya |
| 6,179,132 B1 | 1/2001 | Moya |
| 6,273,271 B1 | 8/2001 | Moya |
| 6,354,443 B1 | 3/2002 | Moya |
| 6,767,977 B2 | 7/2004 | Arcella et al. |
| 8,133,927 B2 | 3/2012 | Arcella et al. |
| 2006/0204654 A1 | 9/2006 | Klare et al. |

FOREIGN PATENT DOCUMENTS

| | | |
|---|---|---|
| JP | S5892415 A | 6/1983 |
| JP | 2002-331232 A | 11/2002 |
| JP | 2016-529095 | 9/2016 |
| WO | WO 2010/117845 A2 | 10/2010 |
| WO | WO 2016/182880 A1 | 11/2016 |

OTHER PUBLICATIONS

Sauguet et al., "Fluorinated Copolymers and Terpolymers Based on Vinylidene Fluoride and Bearing Sulfonic Acid Side-Group," *Journal of Polymer Science: Part A: Polymer Chemistry*, 45: 1814-1834 (2007).
European Patent Office, European Search Report issued in European Application No. 20169923.8 (dated Sep. 8, 2020).
Intellectual Property Office of Singapore Search Report in Singapore Application No. SG10202003898Q (dated Apr. 12, 2021).
Japanese Patent Office, Notice of Reasons for Rejection in Japanese Patent Application No. 2020-074112 (dated Mar. 30, 2021) English translation.

*Primary Examiner* — John Kim
(74) *Attorney, Agent, or Firm* — Leydig, Voit & Mayer, Ltd.

(57) ABSTRACT

Disclosed are porous membranes including a porous support and a coating comprising a copolymer having monomeric units A and B, and optionally monomeric units C; wherein A is a halogenated vinyl monomer other than tetrafluoroethylene, a halogenated alkyl vinyl ether, or an alkene of the formula $C_nH_{2n}$, wherein n is 1-6; B is a perfluoro (alkyl vinyl)ether compound, a perfluoroalkyl vinyl compound, or a perfluoro alkoxyalkyl vinyl ether compound, each compound having one or more sulfonic acid groups or a salt thereof, one or more sulfonyl fluoride groups, one or more sulfonamide groups, or one or more sulfonate ester groups, and C is vinylidene fluoride. Also disclosed are methods of preparing such porous membranes and methods of treating fluids by the use of these membranes.

15 Claims, No Drawings

POROUS MEMBRANE HAVING A FLUORINATED COPOLYMER AS SURFACE TREATMENT

BACKGROUND OF THE INVENTION

The properties of fluoropolymer membranes, for example, porous PTFE membranes, including their mechanical strength, chemical resistance or inertness, non-adhesiveness, excellent dielectric property, thermal stability at high temperature and low coefficient of friction make them very attractive for various applications. However, for certain applications, it will be beneficial to modify the surface of PTFE without affecting its intrinsic properties. Efforts have been made to modify the surface and the chemical properties of PTFE membranes in order to improve the suitability of the membranes for specific applications. For example, efforts have included surface coating, blending, high energy surface modification, for example, broad band ultraviolet radiation (BBUV), where the membrane is exposed to a UV radiation of wavelength 250-450 nm, and plasma treatment, free radical, and ozone etching, atomic layer deposition, and synthesis of modified PTFE-like polymers. However, most of these efforts have not resulted in satisfactory membrane performance when exposed to extremely corrosive fluids, such as hot sulfuric acid such as those encountered in microelectronics, or oxidative fluids.

The foregoing shows that there exists an unmet need for porous fluoropolymer membranes which are resistant to corrosive or oxidative fluids.

BRIEF SUMMARY OF THE INVENTION

The present invention provides a porous membrane comprising a porous fluorinated polymeric support and a coating comprising a first copolymer, the first copolymer comprising polymerized monomeric units A and B, and optionally polymerized monomeric units C;

wherein A is a halogenated vinyl monomer other than tetrafluoroethylene, a halogenated alkyl vinyl ether, or an alkene of the formula $C_nH_{2n}$, wherein n is 1-6; B is a perfluoro (alkyl vinyl)ether compound, a perfluoroalkyl vinyl compound, or a perfluoro alkoxyalkyl vinyl ether compound, each compound having one or more sulfonic acid groups or a salt thereof, one or more sulfonyl fluoride groups, one or more sulfonamide groups, or one or more sulfonate ester groups, and C is vinylidene fluoride;

if C is present, it is present in the range of up to about 30 mol % of the sum of A, B, and C;

and the first copolymer has an equivalent weight of from about 1200 to about 3000 per sulfonic acid group or a salt thereof.

The present invention further provides a method of preparing a porous membrane comprising a porous fluorinated polymeric support and a coating comprising a first copolymer, the first copolymer comprising polymerized monomeric units A and B, and optionally polymerized monomeric units C; wherein: A is a halogenated vinyl monomer other than tetrafluoroethylene, a halogenated alkyl vinyl ether, or an alkene of the formula $C_nH_{2n}$, wherein n is 1-6; B is a perfluoro (alkyl vinyl)ether compound, a perfluoroalkyl vinyl compound, or a perfluoro alkoxyalkyl vinyl ether compound, each compound having one or more sulfonic acid groups or a salt thereof, one or more sulfonyl fluoride groups, one or more sulfonamide groups, or one or more sulfonate ester groups, and C is vinylidene fluoride;

if C is present, it is present in the range of up to about 30 mol %;

and the first copolymer has an equivalent weight of from about 1200 to about 3000 per sulfonic acid group; the method comprising:

providing a porous fluorinated polymeric support and coating the porous fluorinated polymeric support with the first copolymer; and when B is a perfluoro (alkyl vinyl)ether having one or more sulfonyl fluoride groups or sulfonate ester groups, hydrolyzing one or more of the sulfonyl fluoride groups or sulfonate ester groups with an alkali.

The present invention further provides methods of treating or filtering fluids by the use of these porous membranes.

An advantage of embodiments of the porous membrane is that the membranes have long-term stability in hot concentrated sulfuric acid at a temperature in the range of 150° C. to 200° C.

DETAILED DESCRIPTION OF THE INVENTION

In accordance with an embodiment, the invention provides a porous membrane comprising a porous fluorinated polymeric support and a coating comprising a first copolymer, the first copolymer comprising polymerized monomers A and B, and optionally polymerized monomer C;

wherein A is a halogenated vinyl monomer other than tetrafluoroethylene, a halogenated alkyl vinyl ether, or an alkene of the formula $C_nH_{2n}$, wherein n is 1-6;

B is a perfluoro (alkyl vinyl)ether compound, a perfluoroalkyl vinyl compound, or a perfluoro alkoxyalkyl vinyl ether compound, each compound having one or more sulfonic acid groups or a salt thereof, one or more sulfonyl fluoride groups, one or more sulfonamide groups, or one or more sulfonate ester groups, and C is vinylidene fluoride;

if C is present, it is present in the range of up to about 30 mol % of the sum of A, B, and C;

and the first copolymer has an equivalent weight of from about 1200 to about 3000 per sulfonic acid group or a salt thereof.

The present invention further provides a method of preparing a porous membrane comprising a porous fluorinated polymeric support and a coating comprising a first copolymer, the first copolymer comprising polymerized monomeric units A and B, and optionally polymerized monomeric units C; wherein: A is a halogenated vinyl monomer other than tetrafluoroethylene, a halogenated alkyl vinyl ether, or an alkene of the formula $C_nH_{2n}$, wherein n is 1-6; B is a perfluoro (alkyl vinyl)ether compound, a perfluoroalkyl vinyl compound, or a perfluoro alkoxyalkyl vinyl ether compound, each compound having one or more sulfonic acid groups or a salt thereof, one or more sulfonyl fluoride groups, one or more sulfonamide groups, or one or more sulfonate ester groups, and C is vinylidene fluoride;

if C is present, it is present in the range of up to about 30 mol %;

and the first copolymer has an equivalent weight of from about 1200 to about 3000 per sulfonic acid group; the method comprising:

providing a porous fluorinated polymeric support and coating the porous fluorinated polymeric support with the first copolymer; and when B is a perfluoro (alkyl vinyl)ether having one or more sulfonyl fluoride groups or sulfonate ester groups, hydrolyzing one or more of the sulfonyl fluoride groups or sulfonate ester groups with an alkali.

In accordance with an embodiment, A is selected from chlorotrifluoroethylene, bromotrifluoroethylene, hexafluoropropylene, trifluoroethylene, $H_2C=CHCF_3$, $H_2C=CFCF_3$, $CHF=CHCF_3$, $H_2C=CFCl$, $H_2C=CFBr$, $CF_2=CFOCF_3$, $CF_2=CFOC_3F_7$, $CF_2=CFOC_2H_4C_6F_{13}$, $CH_2=CHOC_2H_4C_6F_{13}$, $CF_2=CFOC_2H_4Br$, ethylene, propylene, and any combination thereof. In a particular embodiment, A is chlorotrifluoroethylene.

In accordance with any of the above embodiments, B is selected from $CF_2=CFOCF_2CF(CF_3)OC_2F_4SO_2F$, $CF_2=CFOCF_2CF(CF_3)OC_2F_4SO_3H$, $CF_2=CFOC_2F_4SO_2F$, $CF_2=CFOC_2F_4SO_3H$, $CF_2=CFC_2F_4SO_2F$, $CF_2=CFC_2F_4SO_3H$, $CF_2=CFOC_4F_8SO_2F$, $CF_2=CFOC_4F_8SO_3H$, and any combination thereof. In a particular embodiment, B is $CF_2=CFOCF_2CF(CF_3)OC_2F_4SO_2F$. In another embodiment, B is $CF_2=CFOCF_2CF(CF_3)OC_2F_4SO_3H$.

In accordance with any of the above embodiments, if C is present, it can be present in an amount of up to about 30 mol %, up to about 20 mol %, up to about 10 mol %, from about 5 to about 30 mol %, from about 5 to about 20 mol %, from about 10 to about 30 mol %, from about 10 to about 20 mol %, from about 2 to 10 mol %, or from about 1 to about 5 mol %, of the sum of A, B, and C. In accordance with embodiments of the invention, when C is present in low amounts as described herein, the porous membrane is more stable to hot alkaline oxidizing solutions, for example, the loss in weight is significantly less when exposed to hot alkaline oxidizing solutions. Hot alkaline oxidizing solutions are known in the art; see, e.g., U.S. Pat. No. 5,928,792, Example 13.

The copolymer can be a random copolymer or a block copolymer.

In accordance with any of the above embodiments, the porous membrane comprises any suitable porous fluoropolymer support, for example, a support made from PTFE (polytetrafluoroethylene), PVDF (polyvinylidene fluoride), PFA (perfluoroalkoxyvinyl polymer), PMA (perfluoroalkoxyvinyl polymer), PVF (polyvinyl fluoride), PCTFE (polychlorotrifluoroethylene), FEP (fluorinated ethylenepropylene polymer), ETFE (polyethylenetetrafluoroethylene), ECTFE (poly ethylene-chlorotrifluoroethylene), PFPE (perfluoropolyether), FKM (poly chlorotrifluorothylene-vinylidene fluoride) and perfluoropolyoxetane. The porous support is preferably PTFE, FEP, PFA or PCTFE, and is most preferably PTFE. The porous support can have any suitable pore size, e.g., from about 2 nm to about 10 microns.

The copolymer can be of any suitable molecular weight, for example, in an embodiment, a number or weight (Mn or Mw) average molecular weight from about 10 kDa to about 1000 kDa, 20 kDa to about 600 kDa, preferably from about 75 kDa to about 500 kDa, and more preferably from about 100 kDa to about 500 kDa.

The copolymers can be prepared by any suitable method, for example, by radical polymerization. Any suitable radical initiator can be used. Examples of suitable radical initiators include 2,2'-azobis(2-methylpropionitrile) (AIBN), 4,4'-azobis(4-cyanopentanoic acid) (ACPA), hydrogen peroxide, t-butyl hydroperoxide, t-butyl perbenzoate, t-amyl perbenzoate, t-butyl peroctoate, t-amyl peroctoate, t-butyl peroxypivalate, ditertiary butyl peroxide, t-butylcyclohexyl peroxydicarbonate, tertiary-amyl hydroperoxide, dibenzoyl peroxide, ammonium persufate, potassium persulfate, sodium persulfate, methyl ethyl ketone peroxide and perfluoro-3-ethyl-2,4-dimethyl-3-pentyl persistent radical.

The polymerization can be conducted in bulk, i.e., in the absence of a solvent, or preferably in a solvent. Examples of suitable solvents for conducting polymerization include water, dimethyl carbonate, acetonitrile, methyl acetate, aromatic hydrocarbons such as benzene, toluene, and xylene, aliphatic hydrocarbons such as n-pentane, hexane, and heptane, alicyclic hydrocarbons such as cyclohexane, and halogenated solvents such as dichloromethane, dichloroethane, dichloroethylene, tetrachloroethane, chlorobenzene, dichlorobenzene, trichlorobenzene, 1,1,1,3,3-pentafluorobutane, methoxynonafluorobutane (Novec® 7100), and FC75 (perfluoro(butyltetrahydrofuran)) as well as mixtures thereof.

The polymerization can be carried out at any suitable temperature, for example, from −20 to +100° C. or more, preferably from 10° C. to 80° C., particularly 45° C. to 80° C.

The polymers can be isolated by a suitable technique, for example, precipitation with a nonsolvent or coagulation.

"SPM" means hot sulfuric acid hydrogen peroxide mixture ($H_2SO_4$ (96%): $H_2O_2$ (30%) of 70:30, 75:25 or 80:20 by volume) at a temperature of 120° C. to 180° C.

In accordance with an embodiment of the invention, the porous membrane has pores of diameter between 1 nm and 100 nm, 100 nm and 1000 nm, or pores of diameter between 1 μm and 10 μm.

The porous membrane can be prepared by wetting a sheet of PTFE porous support with isopropanol and then coating the support with a 0.1 wt %-10 wt % solution of a polymer in the sulfonic acid or sulfonate form. The coating time ranges between 1 sec and 1 hour. After soaking the support, it is dried at 60° C. to 160° C. The drying time ranges between 10 minutes and 96 h. Alternatively, the porous membrane can be prepared by coating a sheet of PTFE porous support with a 0.1 wt %-10 wt % solution of polymer in the sulfonyl fluoride form. The coating time ranges between 1 sec and 1 hour. After soaking the support, it is dried at 60° C. to 160° C. The drying time ranges between 10 minutes and 96 h. The coated porous support can then by soaked in a basic solution to hydrolyze the sulfonyl fluoride groups into sulfonate groups. The sulfonate groups can be optionally subsequently converted to sulfonic acid groups by soaking in an acidic solution such as 5% HCl.

The change in surface modification in terms of surface tension can be measured by measuring the critical wetting surface tension (CWST). The method relies on a set of solutions of certain composition. Each solution has specific surface tension. The surface tension of the solution ranges from 25 to 92 dyne/cm in small non-equivalent increments. To measure the membrane surface tension, the membrane is positioned on to top of white light table, one drop of a solution of certain surface tension is applied to the membrane surface and the time the drop takes to penetrate through the membrane and become bright white as an indication of light going through the membrane is recorded. Instant wetting is considered when the time the drop takes to penetrate the membrane is ≤10 seconds. If the time >10 seconds, the solution is considered to partially wet the membrane.

The porous membranes according to embodiments of the invention can be used in a variety of applications, including, for example, filtering fluids for the electronics industry (e.g., filtering photoresist fluids in the microelectronics industry, hot sulfuric acid and hot SPM) and for treating fluids containing ionic materials, e.g., as ion exchange membranes.

In accordance with embodiments of the invention, the porous membrane can have a variety of configurations, including planar, flat sheet, pleated, tubular, spiral, and hollow fiber.

The porous membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive porous membrane or filter comprising at least one inventive membrane is disposed in a housing comprising at least one inlet and at least two outlets and defining at least a first fluid flow path between the inlet and the first outlet, and a second fluid flow path between the inlet and second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module are sterilizable. Any housing of suitable shape and providing an inlet and one or more outlets can be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonate resin.

The present invention further provides a method of filtering or treating a fluid, the method comprising passing the fluid through the porous membranes described above.

The following examples further illustrate the invention but, of course, should not be construed as in any way limiting its scope.

EXAMPLES 1-16

These examples illustrate a method of preparing copolymers by free radical initiated copolymerization, in accordance with an embodiment of the invention.

The radical copolymerizations of PFSVE with different monomers was carried out in Hastelloy Parr autoclaves (50 mL, 100 mL or 300 mL), equipped with a rupture disk, a Bourdon-pressure gauge, and inlet and outlet valves. An electronic device controlled and regulated both the heating and the stirring of the autoclave. The vessel was closed and purged three times with 30 bar of pressure with nitrogen for 2 min and a vacuum of $10 \times 10^{-3}$ mbar for 15 min. The radical initiator, PFSVE, and the solvent (if applicable) were introduced via a funnel tightly connected to the inlet valve. The autoclave was frozen at $-90°$ C. and the gases (e.g., chlorotrifluoroethylene, CTFE) were transferred by double weighing. The autoclave was then heated to the required temperature. After stirring for 18 h, the autoclave was cooled down to room temperature. After outgassing to remove unreacted monomers, the autoclave was opened. The reaction mixture was put into a vacuum oven (10 mbar) for 48 h at 80° C. The yields of the reactions were determined gravimetrically (mass of copolymers obtained/mass of monomers transferred into the autoclave).

Tables 1 and 2 set forth the compositions of the reagents in the polymerizations conducted and of the products obtained, as calculated from elemental analysis or $^{19}$F NMR.

TABLE 1

Polymerization conditions and composition of the copolymers 1-12 and 1C-3C.

| Example | VDF, g | CTFE, g | PFSVE, g | Initiator, g | Solvent, g | Temp, C. | P, Bar |
|---|---|---|---|---|---|---|---|
| 1 | 3 | 20 | 21 | KPS 0.035 | H$_2$O | 70 | 16 |
| 2 |  | 50 | 150 | KPS 0.10 | H$_2$O 180 | 70 | 20 |
| 3 | 2 | 12 | 25 | KPS 0.20 | H$_2$O 30 | 70 | 14 |
| 4 | 8 | 51 | 110 | KPS 0.89 | H$_2$O 180 | 70 | 20 |
| 5 | 8 | 52 | 111 | KPS 0.45 | H$_2$O 180 | 70 | 20 |
| 6 |  | 37 | 110 | KPS 1.51 | H$_2$O | 70 | 20 |
| 7 |  | 37 | 110 | APS 0.51 | H$_2$O 180 | 80 | 14 |
| 8 | 2.5 | 6.5 | 25 | KPS 0.020 | H$_2$O 30 | 70 | 14 |
| 9 | 2 | 10 | 25 | T121 0.40 | DMC 30 | 73 | 6 |
| 10 | 1.5 | 8 | 25 | KPS 0.020 | H$_2$O | 70 | 11 |
| 11 | 2 | 12 | 25 | KPS 0.026 | H$_2$O 30 | 70 | 12 |

TABLE 1-continued

Polymerization conditions and composition of the copolymers 1-12 and 1C-3C.

| | 12 | 2 | 40 | 30 | PPFR 2.10 | None | 83 | 18 |
| --- | --- | --- | --- | --- | --- | --- | --- | --- |
| | 1C | | 37 | 110 | KPS 0.61 | H₂O 180 | 70 | 20 |
| | 2C | | 33 | 104 | PPFR 2.4 | None | 83 | 13 |
| | 3C | 2 | 32 | 104 | PPFR 3.6 | None | 83 | 16 |

| Example | Yield, % | S % | Cl % | VDF mol % | CTFE mol % | PFSVE mol % | Eq wt |
| --- | --- | --- | --- | --- | --- | --- | --- |
| 1 | 37 | 1.00 | 26.26 | | 96 | 4.1 | 3173 |
| 2 | 9 | 1.58 | 22.75 | | 93 | 7.1 | 1960 |
| 3 | 42 | 1.91 | 19.91 | 17 | 75 | 8 | 1675 |
| 4 | 29 | 1.58 | 19.01 | 29 | 65 | 6 | 2025 |
| 5 | 28 | 1.65 | 20.74 | 18 | 76 | 6.7 | 1939 |
| 6 | 18 | 2.23 | 19.28 | | 89 | 11 | 1355 |
| 7 | 21 | 2.00 | 20.74 | | 90 | 9.7 | 1537 |
| 8 | 31 | 2.45 | 14.67 | 36 | 54 | 10 | 1306 |
| 9 | 10 | 2.25 | 15.80 | 34 | 57 | 9 | 1422 |
| 10 | 30 | 2.54 | 14.76 | 34 | 56 | 11 | 1260 |
| 11 | 29 | 1.43 | 21.31 | 20 | 75 | 5.6 | 2238 |
| 12 | 67 | 2.07 | 18.88 | 19 | 72 | 8.7 | 1538 |
| 1C | 23 | 2.63 | 17.99 | | 86 | 14 | 1165 |
| 2C | 9 | 3.37 | 15.70 | | 81 | 19 | 936 |
| 3C | 56 | 4.07 | 12.10 | 11 | 65 | 24 | 786 |

TABLE 2

Polymerization conditions and composition of the copolymers 13-16 and 4C

| Example | VDF, g | HFP, g | TrFE, g | PMVE, g | CTFE, g | PFSVE, g | Initiator, g | Solvent, g | Temp, C. |
| --- | --- | --- | --- | --- | --- | --- | --- | --- | --- |
| 13 | 5 | | | 24 | | 10 | KPS 0.034 | H₂O 30 | 70 |
| 14 | 5 | 15 | | | | 23 | KPS 0.030 | H₂O 30 | 70 |
| 15 | | | 8 | | | 11 | KPS 0.017 | H₂O 30 | 70 |
| 16 | 2 | | | | 40 | 30 | P16S 1.80 | None | 60 |
| 4C | 5 | | | | | 8.7 | KPS 0.013 | H₂O 30 | 70 |

| Example | P, Bar | Yield, % | VDF mol % | HFP mol % | TrFE mol % | PMVE mol % | CTFE mol % | PFSVE mol % | Eq wt |
| --- | --- | --- | --- | --- | --- | --- | --- | --- | --- |
| 13 | 25 | 24 | 51 | | | 42 | | 7 | 1908 |
| 14 | 24 | 12 | 67 | 26 | | | | 7 | 1616 |
| 15 | 23 | 41 | | | 94 | | | 6.0 | 1731 |
| 16 | 12 | 70 | 8 | | | | 84 | 8 | 1733 |
| 4C | 25 | 40 | 87 | | | | | 13 | 874 |

Abbreviations used above are as follows:
VDF: vinylidene fluoride
CTFE: chlorotrifluoroethylene
HFP: hexafluoropropylene
TrFE: trifluoroethylene
PMVE: perfluoromethyl vinyl ether
PFSVE: perfluoro(4-methyl-3,6-dioxaoct-7-ene)sulfonyl fluoride
PPFR: perfluoro-3-ethyl-2,4-dimethyl-3-pentyl persistent radical
APS: ammonium persulfate
KPS: potassium persulfate
DMC: dimethylcarbonate
T121: tert-Amyl peroxy-2-ethylhexanoate.
P16S: tert-butylcyclohexyl peroxydicarbonate.

EXAMPLES 17-30

These examples illustrate the stability of the membrane surface treatment in accordance with an embodiment of the invention when exposed to hot concentrated sulfuric acid.

A piece of PTFE membrane with pore size rated at <10 nm manufactured by Pall Corporation was submerged in a solution of the polymers of examples 1-10, 12-14, 1C, or 2C for 60 sec and removed from the solution. The samples were dried at 60° C. for 15 min. The samples were then submerged in a 0.1M solution of potassium hydroxide in 50/50 IPA/water for an hour. The samples were submerged in 60/40 IPA/water for 15 min, and then soaked in water for an hour three times. The samples were dried at 60° C. for 20 min. The CWST was measured by dropping solutions of known surface tension and recording the highest surface tension that completely wet the sample. Fresh samples were immersed in isopropanol for 5 min, and then in water for 10 min and again in water for an hour. The samples were left submerged in water overnight. The samples were submerged in concentrated sulfuric acid at 150° C. for two hours. The samples were removed from the acid and submerged in water several times for at least an hour each time. The samples were dried at 60° C. for 20 min. The CWST was measured by dropping solutions of known surface tension and recording the highest surface tension that completely wet the sample.

The results set forth in Table 3 below show that the coated membranes had CWST values higher than the untreated membrane and that the coated membranes were stable in hot concentrated sulfuric acid.

TABLE 3

Stability of surface treatment exposed to hot concentrated sulfuric acid

| Example | Polymer example | Initial CWST dyne/cm | CWST dyne/cm after H$_2$SO$_4$ |
|---|---|---|---|
| 17 | 1 | 32 | N/A |
| 18 | 2 | 33 | 33 |
| 19 | 3 | 33 | 34 |
| 20 | 4 | 32 | N/A |
| 21 | 5 | 33 | 33 |
| 22 | 6 | 33 | 33 |
| 23 | 7 | 34 | 36 |
| 24 | 8 | 34 | 34 |
| 25 | 9 | 39 | 39 |
| 26 | 10 | 36 | 36 |
| 27 | 12 | 34 | 36 |
| 28 | 13 | 32 | 32 |
| 29 | 14 | 33 | 36 |
| 30 | 16 | 33 | 34 |
| 31 | 4C | 36 | 32 |
|  | none | <31 | <31 |

EXAMPLES 32-40

These examples illustrate another method for preparing membranes of the present invention and the stability of the surface treatment in hot concentrated sulfuric acid.

Solutions of 12% tetramethyl ammonium hydroxide in 1:1 water: IPA were added to 1% solutions of the polymers of examples 2, 6, 7 and 2C in 6:1 Novec® 72DE:Novec® 7100. Ten equivalents of the base were added, and the solutions were allowed to stir for about 8 hr with occasional shaking. Water (~0.5-1 volume) was added, and the products were collected by filtration, washed with water and dried.

Solutions of 12% tetramethyl ammonium hydroxide in 1:1 water: IPA were added to 1% solutions of the polymers of examples 1, 3-5 and 8 in 6:1 Novec® 72DE: Novec® 7100 using 1.9 equivalents of the base. The solutions were allowed to stir for about 8 hr with occasional shaking. About ⅔$^{rd}$ of the solvent was then removed on a rotary evaporator. The samples were extracted with about 3 volumes of water, and the resulting products were recovered by removing the solvent on a rotary evaporator.

A piece of PTFE membrane rated at <10 nm manufactured by Pall Corporation was submerged in a solution of the hydrolyzed polymer for 60 sec and removed from the solution. The samples were dried at 60° C. for 15 min and weighed. The CWST was measured by dropping solutions of known surface tension and recording the highest surface tension that completely wet the sample. Fresh samples were immersed in isopropanol for 5 min, and then in water for 10 min and again in water for an hour. The samples were left submerged in water overnight. The samples were submerged in concentrated sulfuric acid at 150° C. for two hours. The samples were removed from the acid and the samples were then submerged in water several times for at least an hour each time. The samples were dried at 60° C. for 20 min. The CWST was measured by dropping solutions of known surface tension and recording the highest surface tension that completely wet the sample. The results set forth in Table 4 show that the coated membranes had CWST values higher than the untreated membrane and that the coated membranes are stable in hot concentrated sulfuric acid.

TABLE 4

CWST values of surface treated membranes

| Example | Precursor polymer example | Initial CWST dyne/cm | CWST dyne/cm after H$_2$SO$_4$ |
|---|---|---|---|
| 32 | 1 | 33 | 33 |
| 33 | 8 | 33 | 31 |
| 34 | 2 | 36 | 33 |
| 35 | 3 | 36 | 39 |
| 36 | 4 | 34 | 37 |
| 37 | 5 | 33 | 34 |
| 38 | 1C | 36 | 39 |
| 39 | 6 | 33 | 33 |
| 40 | 7 | 34 | 36 |
|  | none | <31 | <31 |

C, e.g., as in 2C herein, refers to a comparative example.

EXAMPLES 41-47

These examples illustrate that the uptake of copolymers by PTFE membranes are higher when the molecular weight of the copolymer is higher.

Pieces of PTFE microfiltration membrane were submerged in a 2% wt/volume solution of the polymers of examples 3-7 or 2C for 60 sec and removed from the solution. The samples were dried at 60° C. for 15 min. The samples were then submerged in a 0.1M solution of potassium hydroxide in 50/50 IPA/water for an hour. The samples were then submerged in 60/40 IPA/water for 15 min, and then soaked in water for an hour three times. The samples were dried at 60° C. for 20 min. The samples were then placed in an IPA bath at 75° C. overnight. The samples were dried at 60° C. for 20 min and weighed. The results are set forth in Table 5 and show that the polymer uptake was higher with samples having higher molecular weights.

TABLE 5

CWST values of surface treated membranes

| Example | Polymer example | Mn, kDa | Weight gain, % |
|---|---|---|---|
| 41 | 4 | 38 | 8.1 |
| 42 | 3 | 35 | 6.6 |
| 43 | 3 | 35 | 5.1 |
| 44 | 5 | 28 | 5.9 |
| 45 | 1C | 19 | 3.6 |
| 46 | 6 | 15 | 3.6 |
| 47 | 7 | 15 | 2.9 |

C refers to a comparative example.

EXAMPLES 48-57

These examples illustrate that copolymers with higher equivalent weights are retained in greater amounts when PTFE membranes coated with copolymers in accordance with embodiment of the invention are subject to washing in hot isopropanol.

Pieces of PTFE microfiltration membrane were submerged in a 2% wt/volume solution of the polymers of examples 1-5, 8, 2C-4C or Nafion® D521 for 60 sec and removed from the solution. The samples were dried at 60° C. for 15 min. The samples were then submerged in a 0.1M solution of potassium hydroxide in 50/50 IPA/water for an hour. The samples were then submerged in 60/40 IPA/water for 15 min, and then soaked in water for an hour three times. The samples were submerged in 70/30 IPA/H$_2$O briefly, rinsed with water and then submerged in 5% HCl for 2 hr. After copious rinsing with water, the samples were dried at 60° C. for 20 min and weighed. The sample coated with Nafion® was not treated with HCl. The samples were then placed in an IPA bath at 75° C. overnight. The samples were dried at 60° C. for 20 min and weighed. Most data shown is the average of two or more experiments. The results set forth in Table 6 show that retention of copolymers, e.g., fraction retained, with equivalent weights of 1300 or more is greater than the retention of samples with lower equivalent weights.

TABLE 6

Retention of copolymers of the support after washing

| Example | Polymer example | Equivalent weight | Fraction retained |
| --- | --- | --- | --- |
| 48 | 1 | 3130 | 0.97 |
| 49 | 4 | 2040 | 0.98 |
| 50 | 2 | 1960 | 1.01 |
| 51 | 5 | 1920 | 0.92 |
| 52 | 3 | 1670 | 1.02 |
| 53 | 8 | 1300 | 0.98 |
| 54 | 1C | 1220 | 0.77 |
| 55 | Nafion D521 | 1090 | 0.86 |
| 56 | 2C | 940 | 0.68 |
| 57 | 3C | 790 | 0.82 |

C refers to a comparative example.

EXAMPLES 58-71

These examples illustrate that copolymers having lower vinylidene fluoride (VDF) contents are retained in greater amounts when PTFE membranes coated with copolymers in accordance with embodiment of the invention are subject to washing in an alkaline oxidizing solution.

A piece of PTFE membrane rated at <10 nm manufactured by Pall Corporation was submerged in a solution of the polymers of examples 2, 3, 5-13, 1C, 3C or 4C for 60 sec and removed from the solution. The samples were dried at 60° C. for 15 min. The samples were then submerged in a 0.1M solution of potassium hydroxide in 50/50 IPA/water for an hour. The samples were then submerged in 60/40 IPA/water for 15 min, and then soaked in water for an hour three times. The samples were dried at 60° C. for 20 min and weighed. Fresh samples were immersed in isopropanol for 5 min, and then in water for 10 min and again in water for an hour. The samples were left submerged in water overnight. The samples were submerged in a hot alkaline oxidizing solution. The samples were removed from the solution and the samples were then submerged in water several times for at least an hour each time. The samples were dried at 60° C. for 20 min and reweighed. The results set forth in Table 7 show that copolymers with smaller contents of VDF were more stable and lost less weight than the samples with larger VDF contents.

TABLE 7

Effect of VDF content on fraction lost

| Example | Polymer example | VDF mol % | Fraction lost |
| --- | --- | --- | --- |
| 58 | 4C | 87 | 0.69 |
| 59 | 12 | 53 | 0.61 |
| 60 | 13 | 51 | 0.80 |
| 61 | 8 | 36 | 0.59 |
| 62 | 9 | 34 | 0.90 |
| 63 | 10 | 34 | 0.35 |
| 64 | 11 | 20 | 0.55 |
| 65 | 3 | 17 | 0.41 |
| 66 | 5 | 18 | 0.47 |
| 67 | 3C | 11 | 0.42 |
| 68 | 2 | 0 | 0.03 |
| 69 | 6 | 0 | 0.00 |
| 70 | 7 | 0 | 0.19 |
| 71 | 2C | 0 | 0.05 |

C refers to a comparative example.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A porous membrane comprising a porous fluorinated polymeric support and a coating comprising a first copolymer, the first copolymer comprising polymerized monomeric units A, B, and C, wherein:

A is a halogenated vinyl monomer other than tetrafluoroethylene, a halogenated alkyl vinyl ether, or an alkene of the formula $C_nH_{2n}$, wherein n is 1-6;

B is a perfluoro (alkyl vinyl)ether compound, a perfluoroalkyl vinyl compound, or a perfluoro alkoxyalkyl vinyl ether compound, each of said compounds having one or more sulfonic acid groups or a salt thereof, one or more sulfonyl fluoride groups, one or more sulfonamide groups, or one or more sulfonate ester groups; and C is vinylidene fluoride; and C is present in the range of up to about 30 mol % of the sum of A, B, and C; and the first copolymer has an equivalent weight of from about 1200 to about 3000 per sulfonic acid group or a salt thereof, sulfonyl fluoride group, sulfonamide group, or sulfonate ester group.

2. The porous membrane of claim 1, wherein A is selected from chlorotrifluoroethylene, bromotrifluoroethylene, hexafluoropropylene, trifluoroethylene, $H_2C{=}CHCF_3$, $H_2C{=}CFCF_3$, $CHF{=}CHCF_3$, $H_2C{=}CFCl$, $H_2C{=}CFBr$, $CF_2{=}CFOCF_3$, $CF_2{=}CFOC_3F_7$, $CF_2{=}CFOC_2H_4C_6F_{13}$, $CH_2{=}CHOC_2H_4C_6F_{13}$, $CF_2{=}CFOC_2H_4Br$, ethylene, propylene, and any combination thereof.

3. The porous membrane of claim 1, wherein A is chlorotrifluoroethylene.

4. The porous membrane of claim 1, wherein B is selected from $CF_2{=}CFOCF_2CF(CF_3)OC_2F_4SO_2F$, $CF_2{=}CFOCF_2CF(CF_3)OC_2F_4SO_3H$, $CF_2{=}CFOC_2F_4SO_2F$, $CF_2{=}CFOC_2F_4SO_3H$, $CF_2{=}CFC_2F_4SO_2F$, $CF_2{=}CFC_2F_4SO_3H$, $CF_2{=}CFOC_4F_8SO_2F$, $CF_2{=}CFOC_4F_8SO_3H$, and any combination thereof.

5. The porous membrane of claim 1, wherein B is $CF_2{=}CFOCF_2CF(CF_3)OC_2F_4SO_3H$.

6. The porous membrane of claim 1, wherein the first copolymer is produced from a second copolymer comprising polymerized monomeric units A, B', and C, wherein B' is a perfluoro (alkyl vinyl)ether compound, a perfluoroalkyl vinyl compound, or a perfluoro alkoxyalkyl vinyl ether compound, each compound having one or more sulfonyl fluoride groups or sulfonate ester groups, and hydrolyzing the one or more sulfonyl fluoride groups or sulfonate ester groups of said second copolymer with an alkaline solution.

7. The porous membrane of claim 1, wherein the copolymer is a random copolymer or a block copolymer.

8. The porous membrane of claim 1, wherein the fluorinated polymeric support is selected from polytetrafluoroethylene, fluorinated ethylene-propylene copolymer (FEP), perfluoroalkoxy vinyl polymer (PFA), polychlorotrifluoroethylene (PCTFE), and any combination thereof.

9. The porous membrane of claim 1, wherein the fluorinated polymeric support is polytetrafluoroethylene.

10. The porous membrane of claim 1, wherein A is present in the first copolymer in the range of from about 50 to about 95 mol %, B is present in the first copolymer in the range of about 5 to about 20 mol %, and C is present in an the first copolymer in the range of about 5 to about 30 mol %, the sum of A, B, and C being 100 mol %.

11. A method of filtering a corrosive fluid comprising passing the corrosive fluid through the porous membrane of claim 1.

12. The method of claim 11, wherein the corrosive fluid comprises concentrated sulfuric acid.

13. A method of removing ionic materials from a fluid comprising passing the fluid through the porous membrane of claim 1.

14. A method of preparing a porous membrane comprising a porous fluorinated polymeric support and a coating comprising a first copolymer, the first copolymer comprising polymerized monomeric units A, B, and C, wherein:

A is a halogenated vinyl monomer other than tetrafluoroethylene, a halogenated alkyl vinyl ether, or an alkene of the formula $C_nH_{2n}$, wherein n is 1-6;

B is a perfluoro (alkyl vinyl)ether compound, a perfluoroalkyl vinyl compound, or a perfluoro alkoxyalkyl vinyl ether compound, each compound having one or more sulfonic acid groups or a salt thereof, one or more sulfonyl fluoride groups, one or more sulfonamide groups, or one or more sulfonate ester groups, and C is vinylidene fluoride; and C is present in the range of up to about 30 mol % of the sum of A, B, and C, and the first copolymer has an equivalent weight of from about 1200 to about 3000 per sulfonic acid group; the method comprising:

providing a porous fluorinated polymeric support and coating the porous fluorinated polymeric support with the first copolymer; and when B is a perfluoro (alkyl vinyl)ether having one or more sulfonyl fluoride groups, hydrolyzing one or more of the sulfonyl fluoride groups with an alkali.

15. The method of claim 14, wherein A is present in the first copolymer in the range of from about 50 to about 95 mol %, B is present in the first copolymer in the range of about 5 to about 20 mol %, and C is present in an the first copolymer in the range of about 5 to about 30 mol %, the sum of A, B, and C being 100 mol %.

* * * * *